United States Patent
Ehrentraut

(10) Patent No.: US 9,635,708 B2
(45) Date of Patent: Apr. 25, 2017

(54) CIRCUIT ARRANGEMENT FOR A MOBILE COMMUNICATIONS UNIT OF A MOTOR VEHICLE, MOTOR VEHICLE AND METHOD FOR OPERATING A CIRCUIT ARRANGEMENT

(71) Applicant: AUDI AG, Ingolstadt (DE)

(72) Inventor: Herbert Ehrentraut, Beilngries (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/415,398

(22) PCT Filed: Jul. 11, 2013

(86) PCT No.: PCT/EP2013/002044
§ 371 (c)(1),
(2) Date: Jan. 16, 2015

(87) PCT Pub. No.: WO2014/015951
PCT Pub. Date: Jan. 30, 2014

(65) Prior Publication Data
US 2015/0181644 A1    Jun. 25, 2015

(30) Foreign Application Priority Data

Jul. 21, 2012   (DE) .................... 10 2012 014 547

(51) Int. Cl.
*H04M 1/00*    (2006.01)
*H04W 88/06*    (2009.01)
(Continued)

(52) U.S. Cl.
CPC ............ *H04W 88/06* (2013.01); *H04B 1/005* (2013.01); *H04B 1/40* (2013.01)

(58) Field of Classification Search
CPC .......... H04B 1/005; H04B 1/40; H04W 88/06
(Continued)

(56) References Cited

U.S. PATENT DOCUMENTS 8,463,976 B2    6/2013 Kim et al.
2004/0092286 A1    5/2004 Stattin
(Continued)

FOREIGN PATENT DOCUMENTS

CN    1132579    10/1996
CN    1394093    1/2003
(Continued)

OTHER PUBLICATIONS

Chinese Office Action for related Chinese Patent Application No. 201380038799.7, issued Sep. 28, 2015, 7 pages.
(Continued)

*Primary Examiner* — Ping Hsieh
*Assistant Examiner* — Xin Jia
(74) *Attorney, Agent, or Firm* — Staas & Halsey LLP

(57) ABSTRACT

A circuit arrangement for a mobile radio unit of a motor vehicle has a first mobile radio module for mobile radio transmission according to a first mobile radio standard, and a second mobile radio module for mobile radio transmission according to a second mobile radio standard, the first mobile radio module having a communication interface which is intended to interchange control and useful data and is connected to an electrical connection for electrically connecting the circuit arrangement to an external processor unit. The first mobile radio module has an additional interface which is used to electrically connect the first mobile radio module to a communication interface of the second mobile radio module, which communication interface is designed to interchange control and useful data. Reliable mobile radio transmission is enabled for voice data and other digital useful data with little development and circuit complexity.

15 Claims, 2 Drawing Sheets

(51) Int. Cl.
*H04B 1/00* (2006.01)
*H04B 1/40* (2015.01)

(58) Field of Classification Search
USPC ............... 455/552.1, 553.1, 550.1, 551, 3.1
See application file for complete search history.

(56) References Cited

U.S. PATENT DOCUMENTS

| | | |
|---|---|---|
| 2005/0003864 A1 | 1/2005 | Elliot et al. |
| 2005/0075128 A1 | 4/2005 | Diedrich et al. |
| 2006/0073829 A1 | 4/2006 | Cho et al. |
| 2007/0142001 A1 | 6/2007 | Sanders |
| 2008/0077882 A1* | 3/2008 | Kramer et al. ............... 715/810 |
| 2008/0125167 A1* | 5/2008 | Fujii ........................ 455/552.1 |
| 2008/0192806 A1 | 8/2008 | Wyper et al. |
| 2009/0262669 A1 | 10/2009 | Sanders |
| 2010/0234071 A1* | 9/2010 | Shabtay et al. ........... 455/562.1 |
| 2010/0304737 A1* | 12/2010 | Jain et al. .................. 455/426.1 |
| 2010/0325335 A1* | 12/2010 | Kim et al. .................... 710/316 |
| 2011/0136446 A1 | 6/2011 | Komninakis et al. |
| 2011/0149908 A1 | 6/2011 | Olsson |
| 2011/0302411 A1 | 12/2011 | Liang et al. |
| 2012/0027221 A1 | 2/2012 | Davis |
| 2012/0033718 A1* | 2/2012 | Kauffman ............ H04B 1/3822 375/222 |
| 2012/0071086 A1 | 3/2012 | Wu et al. |

FOREIGN PATENT DOCUMENTS

| | | |
|---|---|---|
| CN | 1604393 | 4/2005 |
| CN | 101375526 | 2/2009 |
| CN | 101707797 | 5/2010 |
| CN | 201839451 | 5/2011 |
| DE | 102012014547.0 | 7/2012 |
| EP | 2134000 | 12/2009 |
| KR | 102010138751 | 12/2010 |
| WO | 2005/125023 | 12/2005 |
| WO | PCT/EP2013/002044 | 7/2013 |

OTHER PUBLICATIONS

German Office Action for German Priority Patent Application No. 10 2012 014 547.0, issued Apr. 12, 2013, 5 pages.
English language International Search Report for PCT/EP2013/002044, mailed Nov. 7, 2013, 2 pages.
English language the International Preliminary Report on Patentability for PCT/EP2013/002044, mailed Feb. 5, 2015, 10 pages.

* cited by examiner

CIRCUIT ARRANGEMENT FOR A MOBILE COMMUNICATIONS UNIT OF A MOTOR VEHICLE, MOTOR VEHICLE AND METHOD FOR OPERATING A CIRCUIT ARRANGEMENT

CROSS REFERENCE TO RELATED APPLICATIONS

This application is based on and hereby claims priority to International Application No. PCT/EP2013/002044 filed on Jul. 11, 2013 and German Application No. 10 2012 014 547.0 filed on Jul. 21, 2012, the contents of which are hereby incorporated by reference.

BACKGROUND

The invention relates to a circuit arrangement for a mobile radio unit of a motor vehicle, having two mobile radio modules which are designed for mobile radio transmission according to different mobile radio standards. The invention also includes a motor vehicle with a mobile radio unit having the circuit arrangement. Finally, the invention also relates to a method for operating the circuit arrangement.

In a motor vehicle, for example an automobile, telephony and Internet connection are possible only via a radio link to a mobile radio network. In this case, a mobile radio unit provided in the motor vehicle for this purpose couples a control processor of the motor vehicle, for example a processor of an infotainment system, to the antenna system. During transmission, the mobile radio unit generates the analog mobile radio signals from the useful data (voice data or other digital data) output by the control processor and, during reception, extracts useful data from mobile radio signals received by the mobile radio unit via the antenna system and passes said data to the control processor. The conversion between the analog mobile radio signals and the digital useful data is effected using so-called mobile radio modules which are commercially available under the designation GSM module (GSM—Global System for Mobile Communications), UMTS module (UMTS—Universal Mobile Telecommunications System) or LTE module (LTE—Long-Term Evolution). When developing a mobile radio unit for a motor vehicle of a particular series, it is necessary to stipulate the mobile radio standards, that is to say GSM, UMTS or LTE for instance, for which mobile radio transmission by the mobile radio unit is intended to be enabled. Although younger mobile radio standards have the advantage here that they can be presumably used for longer, it may be disadvantageous that all data services have not yet been reliably implemented. In connection with the LTE mobile radio standard for example, it is known that the standard provided in LTE for voice transmission VoLTE is currently not supported by the mobile radio networks. In order to transmit voice, an LTE module must switch to an older mobile radio standard. In contrast, a mobile radio standard which is older in comparison affords the advantage that the available systems are established and tried and tested and therefore operate reliably. If a mobile radio unit is used with an older mobile radio standard for many years, it may emerge, however, that the customers feel the mobile radio unit to be out of date since younger mobile radio standards have become established in the meantime.

In connection with mobile radio devices, for instance mobile telephones, it is known practice to provide a dual mode in which voice data or other useful data can be transmitted using UMTS or GSM, for example. In this case, such a mobile radio device has two mobile radio modules, for example a GSM module and a UMTS module. In order to set up a connection for useful data transmission (voice data or equally other useful data), an attempt is first of all made to set up a connection using the mobile radio module with the younger mobile radio standard, that is to say the UMTS module. If no UMTS connection is possible, a changeover is made to the mobile radio module with the older mobile radio standard, that is to say the GSM module, and the latter is used to set up the connection.

SUMMARY

One possible object is to provide a mobile radio unit for a motor vehicle, which mobile radio unit enables reliable mobile radio transmission for voice data and other digital useful data with little development and circuit complexity.

The inventor proposes a circuit arrangement that comprises two mobile radio modules for mobile radio transmission according to two different mobile radio standards. One of the mobile radio modules, referred to here as the first mobile radio module, is preferably a UMTS module or an LTE module. The UMTS module may also simultaneously support GSM and the LTE module may also simultaneously support UMTS and GSM. The designations UMTS/GSM module and LTE/UMTS/GSM module are introduced for this purpose. In contrast, the second mobile radio module is preferably a GSM module. Each of the mobile radio modules has, in a manner known per se, a communication interface for interchanging control and useful data. The communication interface is those contacts and the logic of the respective mobile radio module linked to the latter, via which the mobile radio module interchanges useful data with local devices and the mobile radio module can be controlled by local devices. In order to connect the circuit arrangement to the remaining on-board electronics, the circuit arrangement has an electrical connection. In this case, only the communication interface of the first mobile radio module is connected to this connection. In other words, it is only possible for an external processor unit, for example a control processor of an infotainment system of the motor vehicle, to directly interchange control and useful data with the communication interface of the first mobile radio module via the electronic connection. In contrast, in the proposed circuit arrangement, the second mobile radio module is not directly connected to the electrical connection of the circuit arrangement. Instead, the first mobile radio module has an additional interface which is used to electrically connect the first mobile radio module to the communication interface of the second mobile radio module. In other words, the first mobile radio module is situated, in terms of circuitry, between the electrical connection and the second mobile radio module. The external processor unit mentioned can therefore communicate with the second mobile radio module only indirectly via the first mobile radio module.

The circuit arrangement has the advantage that the electrical connection for connecting the circuit arrangement to the vehicle electronics must have comparatively few signal lines, namely only those lines needed for interchanging control and useful data with a single communication interface. Nevertheless, mobile radio transmission using two different mobile radio standards is enabled in the circuit arrangement.

The inventor also proposes a motor vehicle that accordingly has a mobile radio unit which comprises one embodiment of the circuit arrangement. In this case, a control processor of the motor vehicle, which is set up to interchange data with a mobile radio network, that is to say the control processor of the infotainment system for example, may be coupled in the described manner to the communication interface of the first mobile radio module via the electrical connection of the circuit arrangement. In this case, the control processor must be advantageously designed only for communication with the first mobile radio module.

In order to make it possible for the control processor to use the second mobile radio module, the the inventor proposes a method according that provides for the first mobile radio module to receive a control command at its communication interface, as can be transmitted, for example, from the control processor to the communication interface of the first mobile radio module for the purpose of setting up a call (telephony) or setting up a connection for an Internet connection. The first mobile radio module then examines the received control command in order to determine whether the latter is intended for the first or second mobile radio module. In the second case, that is to say if a connection is intended to be set up via the second mobile radio module, the first mobile radio module then controls the second mobile radio module according to the received control command via its additional interface. As a result, the second mobile radio module then initiates call setup or connection setup.

It is possible to determine whether a particular control command is intended for the first or second mobile radio module in different ways. On the one hand, the external control processor may be set up to transmit corresponding signals to the first mobile radio module in order to expressly indicate thereby which mobile radio module is intended to execute the control command.

However, another advantage results if the first mobile radio module itself decides whether it is intended to execute the received control command itself or whether it is intended to cause the second mobile radio module to execute the control command. This is because the control software of the external control processor then does not have to be designed to control two different mobile radio modules. In order to enable such independent assignments of a control command to the first or second mobile radio module by the first mobile radio module, the first mobile radio module can check, for example, which of the two mobile radio modules can presumably be used to set up a radio link with a better signal-to-noise ratio. Similarly, it is possible to stipulate that, in principle, a call for telephony is intended to be set up by the second mobile radio module, that is to say a GSM module in particular, while digital useful data which differ from voice signal data are intended to be effected, in principle, using the first mobile radio module, that is to say the UMTS module or the LTE module in particular. The first mobile radio module preferably has a control device which is set up to itself generate the control commands for controlling the second mobile radio module and to transmit said commands to the second mobile radio module via the additional interface. This results in the advantage that the external processor unit need not be designed to control the second mobile radio module.

In order to make it possible to interchange the actual useful data, that is to say the voice data or the non-voice-related digital data, between the second mobile radio module and the external processor unit, the method can be developed by designing the first mobile radio module to transmit useful data between its communication interface and its additional interface, that is to say to loop through the useful data. In this case, provision may be made for direct transmission or transmission using a buffer. For example, a digital voice signal, for example a PCM signal (PCM—Pulse Code Modulation), may be interchanged between the external processor unit and the second mobile radio module. During transmission by the first mobile radio module, signal processing can also be carried out by the first mobile radio module in this case.

The transmission of the useful data between the communication interface of the first mobile radio module and its additional interface is expediently enabled by a transfer device which can electrically connect mutually corresponding connections of the communication interface and of the additional interface directly to one another, for example, or else can also transmit data, for example, using intermediate buffering. Audio data can be transmitted, for example, by coupling the audio connections of the two communication interfaces via the intermediate interface.

The operation of two independent mobile radio modules previously also required the provision of two SIMs (SIM—Subscriber Identity Module). In this context, one development of the circuit arrangement provides for the first mobile radio module to be designed to serially receive identification data relating to a user from a SIM via a connection of its communication interface. This then makes it possible to transmit the identification data via an individual electrical interface. For example, the transmission can be effected according to the USB standard (USB—Universal Serial Bus). The CDC/ACM (Communication Device Class/Abstract Control Model) specification provided within the scope of the USB standard can be used here in particular.

In the circuit arrangement, the two mobile radio modules are preferably arranged on a common plug-in card. The circuit arrangement can then be installed, for example, in a conventional control unit in which a slot for a plug-in card with only one individual mobile radio module is provided.

Another advantageous development of the circuit arrangement makes it possible to operate both mobile radio modules using one antenna system, as is provided for the operation of an individual mobile radio module with antenna diversity. Such an antenna system generally comprises a main antenna and a secondary antenna, the main antenna having a transfer characteristic which is more favorable for a radio link, in particular lower directivity. For this purpose, the main antenna is generally arranged on a roof of the motor vehicle. In contrast, in order to enable antenna diversity, the secondary antenna may be arranged at a shielded location, for example in the bumper, since the practice of arranging two antennas on the roof is generally undesirable. In order to now make it possible to use the main antenna for both mobile radio modules, one embodiment of the circuit arrangement provides a switching device which connects the first mobile radio module to a main antenna connection of the circuit arrangement and at the same time connects the second mobile radio module to a secondary antenna connection of the circuit arrangement in a first switching state and conversely couples the first mobile radio module to the secondary antenna connection and couples the second mobile radio module to the main antenna connection in a second switching state for radio signal transmission. While the second mobile radio module, for instance the GSM module, thus does not transmit any telephony data, but rather only interchanges monitoring data with a GSM mobile radio station, the switching device can be left in the first switching state for this purpose and the monitoring data can be interchanged via the secondary antenna.

At the same time, the complete antenna diversity is available for the first mobile radio module since the first mobile radio module can use both the main antenna and (via a further antenna line) the secondary antenna for reception without disturbing the second mobile radio module. When the second mobile radio module is activated, for instance in connection with a call setup or in the event of an incoming call, the second mobile radio module can then be coupled to the main antenna by switching the switching device to the second switching state. In the meantime, the first mobile radio module can still continue to use the secondary antenna for reception or transmission with reduced bandwidth.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
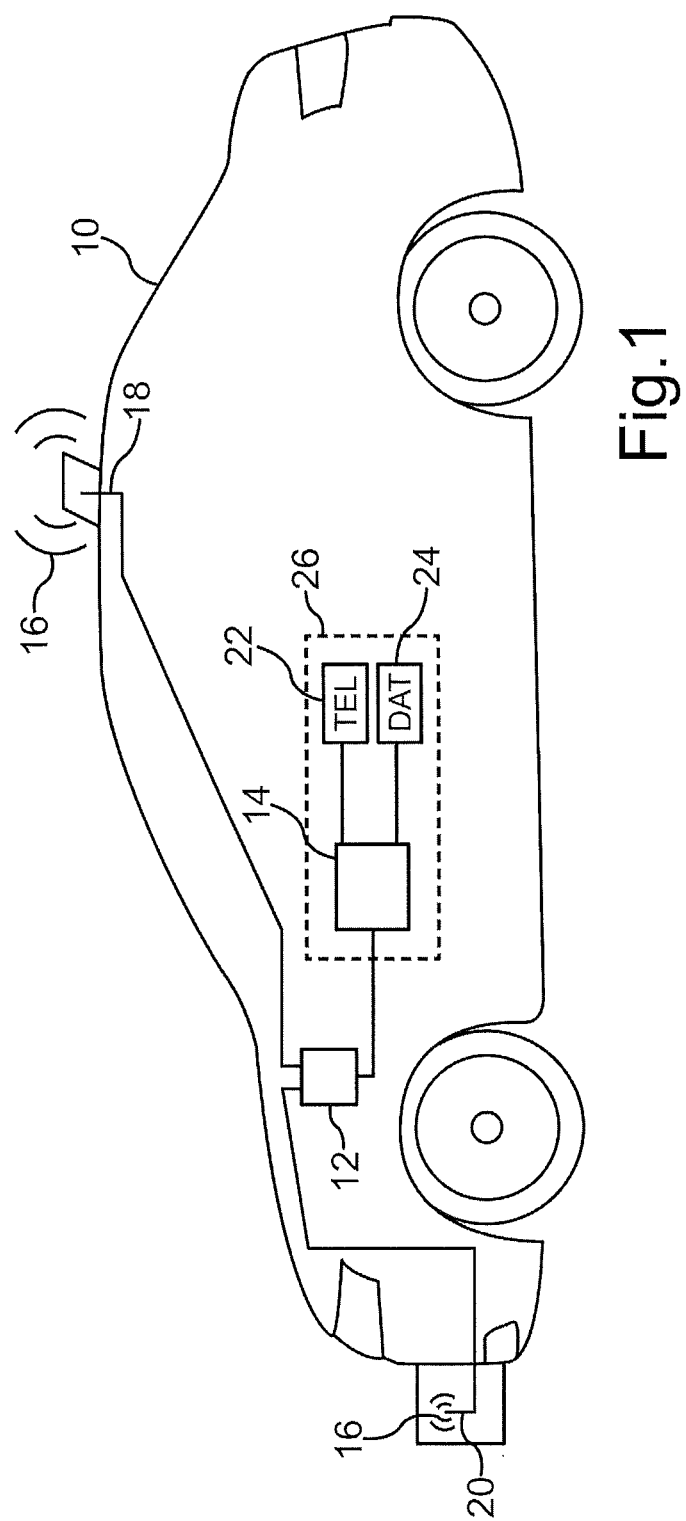
FIG. 1 shows a schematic illustration of a preferred embodiment of the proposed motor vehicle.
Figure 2:
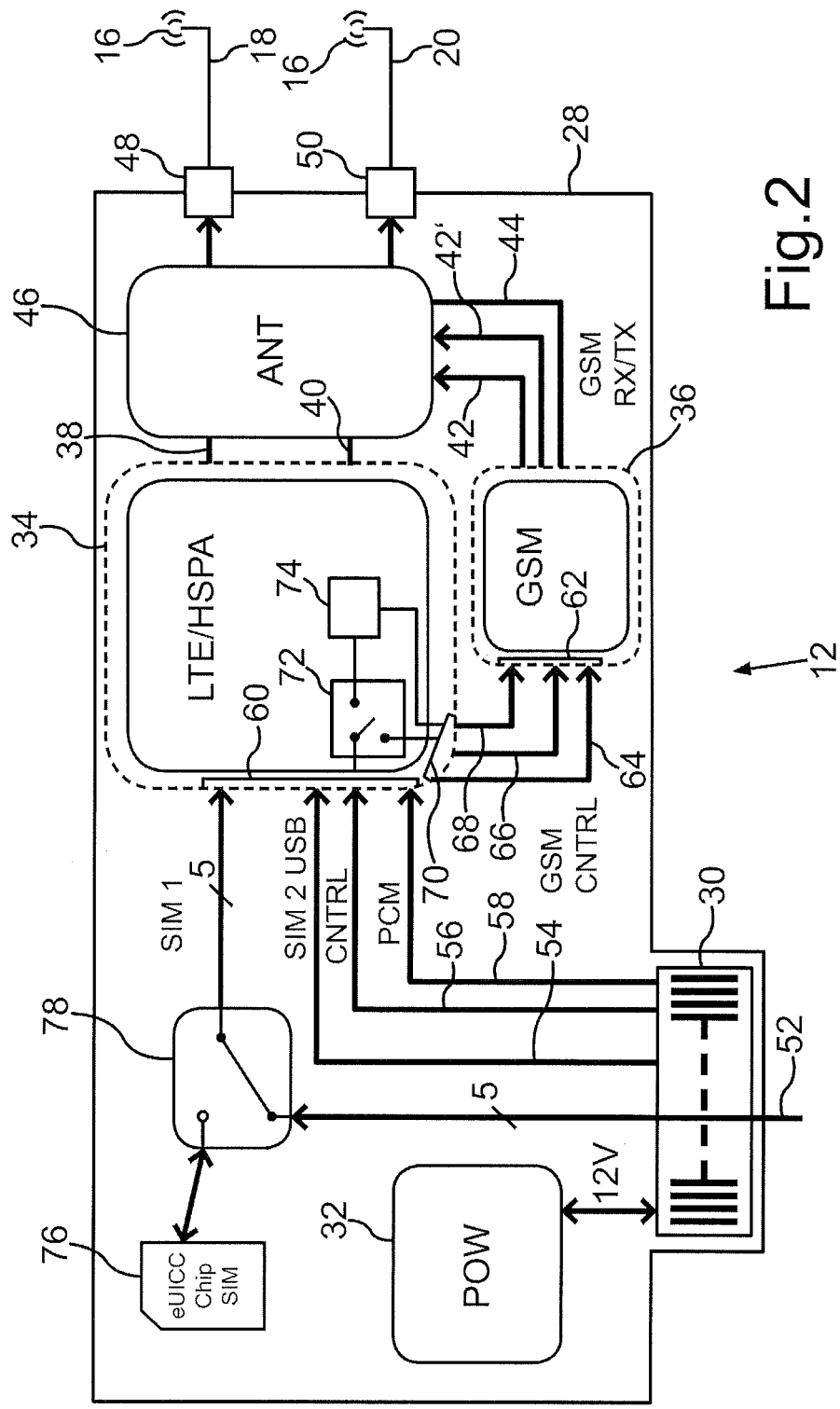
FIG. 2 shows a schematic illustration of a mobile radio unit as can be installed in the motor vehicle from FIG. 1.

Reference will now be made in detail to the preferred embodiments of the present invention, examples of which are illustrated in the accompanying drawings, wherein like reference numerals refer to like elements throughout.

In the example explained below, the described components of the motor vehicle and of the mobile radio unit each represent individual features of the invention which should be considered independently of one another and each also develop the invention independently of one another and therefore can also be considered to be part of the invention individually or in a combination other than the combination shown. Furthermore, the described embodiments can also be supplemented with further features of the features of the invention which have already been described.

FIG. 1 shows a motor vehicle 10 which may be an automobile, for example. A mobile radio unit 12 and a control device 14 are installed in the motor vehicle 10. The mobile radio unit 12 can emit digital data in the form of a mobile radio signal 16 via a main antenna 18 and possibly a secondary antenna 20 and can demodulate mobile radio signals received via the antennas 18, 20 and can extract the useful data contained in the mobile radio signals.

The mobile radio unit 12 therefore makes it possible to convert between the analog mobile radio signals from the antenna 18, 20 and the digital data interchanged between the mobile radio unit 12 and the control device 14. The digital data may be, for example, voice data from a telephone 22 or digital data from a computer 24, for example an on-board computer for reading emails or viewing websites. The control device 14, the telephone 22 and the computer 24 may be part of an infotainment system 26. The telephone 22 may also be a device which is outside the vehicle and communicates with the control device 14 using a Bluetooth connection, for example. The computer 24 may also be a device outside the vehicle, for example a laptop, which communicates with the control device 14 via a cable connection or a radio link (WLAN—Wireless Local Area Network).

The structure and the method of operation of the mobile radio unit 12 are explained in more detail below.

The mobile radio unit 12 may be in the form of a plug-in card 28 which can be inserted into a slot (not illustrated) of a control device of the motor vehicle 10. The mobile radio unit 12 has an electrical connection 30 with a plurality of electrical contacts which are used to interchange signals between the mobile radio unit 12 and the control device 14. A voltage supply 32 is also supplied with the vehicle electrical system voltage (for example 12 V) of the motor vehicle 10 via the connection 30. The mobile radio unit 12 has two mobile radio modules, namely an LTE module 34 and a GSM module 36 in the present example. The LTE module 34 may also additionally support the UMTS and GSM standards. Instead of the LTE module 34, the mobile radio unit 12 may also have a UMTS module or an HSPA module. The UMTS or HSPA module may also additionally support the GSM standard. In this example, the LTE module 34 is used to transmit digital useful data from the computer 34 and from other computers of the motor vehicle 10 and to receive useful data for these devices. The GSM module 36 is used to provide telephone connections. Provision may also be made for the GSM module 36 to be used for telephony only when it is identified that this function currently cannot be provided by the LTE module 34.

Each mobile radio module 34, 36 has a sheet metal housing for shielding radio-frequency radiation, said housing containing digital circuits and analog amplifiers in order to output antenna signals for the antennas 18, 20 at analog outputs 38, 40, 44 and to receive corresponding antenna signals from the antennas 18, 20. The analog outputs 38, 40, 44 are connected to antenna connections 48, 50 for the antennas 18 and 20 via a changeover device 46. The changeover device 46 has controllable switches which, in a switching position, make it possible to connect the analog outputs 38, 40 of the LTE module 34 to one of the antenna connections 48, 50 in each case. In this switch position, the LTE module 34 uses both antennas 18, 20 to receive mobile radio signals 16 using antenna diversity. In this switch position, the analog connection 44 of the GSM module 36 is connected to the secondary antenna 20 via which the GSM module 36 receives monitoring data from surrounding GSM mobile radio stations. In a second switch position of the changeover device 46, the analog connections 38, 40 of the LTE module 34 are connected to the secondary antenna 20. In this switch position, the LTE module 34 uses only the antenna 20 for transmission and reception. In the meantime, the analog connection 44 of the GSM module 36 can be connected to the main antenna 18. The digital connection 42 may be an output for displaying a GSM burst. When emitting a GSM burst, the changeover device 46 may initiate protective measures against overloading of the analog connections 38, 40, for example. The analog connection 44 is for general transmission and reception. As a result, the GSM module 36 can use the better transmission and reception properties of the main antenna 18 to transmit telephony data. The digital connection 42' is used to change over the analog connections 38, 40, 44 to the analog connections 48, 50.

The changeover device 46 also comprises electrical components for impedance matching between the analog connections 38 to 44 and the antennas 18, 20.

Although digital useful data, on the one hand, and telephony data, on the other hand, can be transmitted in the mobile radio unit 12 using the two different mobile radio modules 34, 36, the connection 30 has only connecting contacts for interchanging data between the control device 14 and the mobile radio module 34. There is no need for any further data lines for interchanging data with the GSM module 36 in the connection 30.

The connection 30 is connected to connection contacts of the LTE module 34, inter alia, via five physical lines, referred to as SIM lines 52 here, a USB line 54 for serial data transmission, a control line 56 and an audio line 58. The connection contacts together form a communication interface 60 of the LTE module 34.

The GSM module 36 has a comparable communication interface 62, as is known per se from the related art. The connection contacts of the communication interface 62 are not directly connected to the connection contacts of the connection 30. Instead, the communication interface 62 is connected to further connection contacts of the LTE module 34 at least via a control line 64, an audio line 66 and SIM lines 68. In order to connect the lines 64, 66, 68 to the LTE module 34, it is possible to use connection contacts of the LTE module 34 which can be freely configured by appropriately programming the LTE module 34. The connection contacts used overall form an additional interface 70 of the LTE module 34.

Control software of the LTE module 34 can form a transfer device 72 which can be used to selectively transmit data either between the communication interface 60 and a processing unit 74 of the LTE module 34 or between the communication interface 60 and the additional interface 70. In the latter case, this makes it possible, for example, to forward voice data, which are transmitted in the form of PCM data, for example, from the telephone 22 to the LTE module 34 via the control device 14 on the audio line 58, to the GSM module 36 via the audio line 66. Equally, control commands from the control device 14 can be redirected onto the monitoring line 64 via the monitoring line 56.

In connection with control of the GSM module 36 or else in connection with processing of the audio data, provision may also be made for the processing unit 74 to directly independently output GSM control commands or processed audio data to the GSM module 36 via the intermediate additional interface 70.

Identification data relating to the user from a respective SIM (SIM1 and SIM2) are needed to operate the mobile radio modules 34, 36. The two SIMs are arranged outside the mobile radio unit 12 on at least one SIM card (UICC—Universal Integrated Circuit Card) which can respectively be situated in a slot in the motor vehicle 10. The connection 30 only has the five physical lines of the SIM lines 52 in order to forward the data from the SIM1 to the communication interface 60 of the LTE module 34. The identification data from the second SIM, SIM2, may be transmitted to the LTE module 34 without the need for a further five lines for this purpose. The USB line 54 is designed, as a serial communication interface, to receive identification data from the second SIM (SIM2) in the form of serially transmitted data, for example using a CDC-ACM driver of the LTE module 34. The LTE module 34 is designed to transmit the identification data received via the USB line 54 to the GSM module 36 via the SIM lines 68. The SIM lines 68 may again be, for example, the customary five physical lines for the standard transmission of identification data from a SIM card.

One SIM card in each case would actually have to be provided for use of the LTE module 34 and GSM module 36. However, provision may also be made for two SIM fields of the same SIM card to be used, as is known, for example, from the SuperSIM product from the company NowGSM.

The mobile radio unit 12 may have a further connection for an additional SIM card 76. The manufacturer of the motor vehicle 10 can set up such a communication connection between control devices of the motor vehicle 10 and a service station for the motor vehicle outside the motor vehicle, for example, using the LTE module 34 without this being at the motor vehicle user's expense. For example, such a software update can be transmitted by the motor vehicle manufacturer to control devices of the motor vehicle 10. In order to be able to use the SIM card 76, the mobile radio unit 12 may have a switch 78 which is changed over using control logic (not illustrated) of the motor vehicle 10.

In the case of future implementation of LTE in the vehicle, technical difficulties will be expected according to experience, with the result that it is desirable to have a redundant solution or a fallback solution. The example shows how both an LTE module and a GSM module can be arranged in a mobile radio unit, in particular on a single plug-in card. Both modules share two antennas. One antenna has better reception properties than the other antenna. If necessary, the antenna with the better reception properties is connected to the LTE or GSM module. For example, during a telephone call, the antenna with the better reception properties can be connected to the GSM module. The GSM module preferably controls the changeover logic of the antennas, that is to say the switching device.

The LTE module can be connected to a control processor of a control device, which is not on the plug-in card, via control lines which can likewise be operated using the USB standard. The control for the GSM module is looped through the LTE module using the transfer device and/or is also accordingly influenced by the LTE module if necessary. Equally, the LTE module can be connected to the signal processor which is not on the plug-in module via a digital audio connection. Audio signals for the GSM module are then looped through the LTE module or are also accordingly influenced by the latter if necessary.

Fewer signal lines than in the case of a conventional connection of two mobile radio modules would be needed to connect the plug-in card. In addition, the control processor of the control device need not bear the computation load for controlling two mobile radio modules. The computation load for controlling the GSM module is moved to the LTE module.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A circuit arrangement for a mobile radio unit of a motor vehicle, comprising:
    a first mobile radio module for mobile radio transmission according to a first mobile radio standard, the first mobile radio module having first and second interfaces, the first interface being a communication interface to interchange control and useful data with an external processor unit via an electrical connection that electrically connects the circuit arrangement to the external processor unit, the external processor unit being external to the circuit arrangement;
    a second mobile radio module for mobile radio transmission according to a second mobile radio standard, the second mobile radio module having a communication coupling, the communication coupling being a communication interface that electrically connects to the first mobile radio module via the second interface of the first mobile radio module, so that the first and second mobile radio modules can interchange control and useful data via the communication coupling of the second mobile radio module and the second interface of the first mobile radio module and so that all control and useful data from the second radio module are routed through the first radio module;
a first switch to selectively transmit data to the first mobile radio module or the second mobile radio module;
a SIM chip operable by a vehicle manufacturer; and
a second switch to switch between the SIM chip operable by the vehicle manufacturer and identification data relating to a user received from a Subscriber Identity Module (SIM), wherein
the first and second mobile radio modules, the electrical connection, the SIM chip operable by the vehicle manufacturer and the first and second switches are arranged on a common plug-in card,
the first mobile radio module serially receives the identification data relating to the user via a connection of the first interface of the first mobile radio module,
the identification data relating to the user is received from the Subscriber Identity Module (SIM) via the electric connection, and
the Subscriber Identity Module (SIM) is external to the common plug-in card.

2. The circuit arrangement as claimed in claim 1, wherein
the first switch is a transfer device provided in the first mobile radio module, and
the transfer device selectively transfers a signal between the first and second interfaces of the first mobile radio module.

3. The circuit arrangement as claimed in claim 2, wherein
the communication interfaces of the first and second mobile radio modules each comprise an audio connection to transmit and/or receive audio signals, and
the transfer device transmits the audio signals between the electrical connection and the audio connection of the second mobile radio module, the audio signals being transferred via the audio connection of the first mobile radio module.

4. The circuit arrangement as claimed in claim 1, wherein
the first mobile radio module has a control device to generate control commands to control the second mobile radio module, and
the control commands are transmitted to the second mobile radio module via the second interface of the first mobile radio module.

5. The circuit arrangement as claimed in claim 1, wherein the first interface comprises:
an audio connection to transmit and receive audio signals,
a Subscriber Identity Module (SIM) connection to receive identification data, and
an control connection to receive control commands.

6. The circuit arrangement as claimed in claim 1, wherein the second mobile radio module is a Global System for Mobile (GSM) communication module.

7. The circuit arrangement as claimed in claim 1, wherein the first mobile radio module is selected from the group consisting of a Universal Mobile Telecommunications System/Global System for Mobile (UMTS/GSM) module, an Long-Term Evolution (LTE) module, and an LTE/UMTS/GSM module.

8. The circuit arrangement as claimed in claim 1, further comprising:
a main antenna connection to connect a main antenna;
a secondary antenna connection to connect an additional antenna; and
a switching device to couple the first mobile radio module to the main antenna connection and the second mobile radio module to the secondary antenna connection in a first switching state and to couple the first mobile radio module to the secondary antenna connection and the second mobile radio module to the main antenna connection in a second switching state, for radio signal transmission to/from the first mobile radio module and/or the second mobile radio module.

9. A motor vehicle having a mobile radio unit with a circuit arrangement comprising:
a first mobile radio module for mobile radio transmission according to a first mobile radio standard, the first mobile radio module having first and second interfaces, the first interface being a communication interface to interchange control and useful data with an external processor unit via an electrical connection that electrically connects the circuit arrangement to the external processor unit, the external processor unit being external to the circuit arrangement;
a second mobile radio module for mobile radio transmission according to a second mobile radio standard, the second mobile radio module having a communication coupling, the communication coupling being a communication interface that electrically connects to the first mobile radio module via the second interface of the first mobile radio module, so that the first and second mobile radio modules can interchange control and useful data via the communication coupling of the second mobile radio module and the second interface of the first mobile radio module and so that all control and useful data from the second radio module are routed through the first radio module;
a first switch to selectively transmit data to the first mobile radio module or the second mobile radio module;
a SIM chip operable by a vehicle manufacturer; and
a second switch to switch between the SIM chip operable by the vehicle manufacturer and identification data relating to a user received from a Subscriber Identity Module (SIM), wherein
the first and second mobile radio modules, the electrical connection, the SIM chip operable by the vehicle manufacturer and the first and second switches are arranged on a common plug-in card,
the first mobile radio module serially receives the identification data relating to the user via a connection of the first interface of the first mobile radio module,
the identification data relating to the user is received from the Subscriber Identity Module (SIM) via the electric connection, and
the Subscriber Identity Module (SIM) is external to the common plug-in card.

10. The motor vehicle as claimed in claim 9, wherein
the motor vehicle comprises the external processor unit,
the external processor unit is coupled to the first mobile radio module via the electrical connection and the first interface of the first mobile radio module, and
the external processor unit interchanges data with a mobile radio network via the electrical connection and the first interface of the first mobile radio module.

11. A method for operating a circuit arrangement for a mobile radio unit of a motor vehicle, the circuit arrangement comprising:
a first mobile radio module for mobile radio transmission according to a first mobile radio standard, the first mobile radio module having first and second interfaces, the first interface being a communication interface to interchange control and useful data with an external processor unit via an electrical connection that electrically connects the circuit arrangement to the external processor unit, the external processor unit being external to the circuit arrangement;

a second mobile radio module for mobile radio transmission according to a second mobile radio standard, the second mobile radio module having a communication coupling, the communication coupling being a communication interface that electrically connects to the first mobile radio module via the second interface of the first mobile radio module, so that the first and second mobile radio modules can interchange control and useful data via the communication coupling of the second mobile radio module and the second interface of the first mobile radio module and so that all control and useful data from the second radio module are routed through the first radio module;

a first switch to selectively transmit data to the first mobile radio module or the second mobile radio module;

a SIM chip operable by a vehicle manufacturer; and a second switch to switch between the SIM chip operable by the vehicle manufacturer and identification data relating to a user received from a Subscriber Identity Module (SIM), the first and second mobile radio modules, the electrical connection, the SIM chip operable by the vehicle manufacturer and the first and second switches being arranged on a common plug-in card, the method comprising:

receiving control commands at the first mobile radio module via the first interface of the first mobile radio module;

examining the control commands at the first mobile radio module to determine whether each control command is intended for the first mobile radio module or the second mobile radio module;

controlling the second mobile radio module according to commands intended for the second mobile radio module, the second mobile radio module being controlled by the first mobile radio module via the second interface of the first mobile radio module; and serially receiving via a connection of the first interface of the first mobile radio module, the identification data relating to the user, from the Subscriber Identity Module (SIM) via the electric connection, the Subscriber Identity Module (SIM) being external to the common plug-in card.

12. The method as claimed in claim 11, wherein
the first mobile radio module receives useful data at one of the first and second interfaces, and
the first mobile radio module transmits the useful data to the other of the first and second interfaces.

13. The method as claimed in claim 11, wherein
the first mobile radio module transfers to the second interface, useful data received at the first interface, and
the first mobile radio module transfers to the first interface, useful data received at the second interface.

14. The method as claimed in claim 11, wherein
for mobile radio transmission of telephony data and internet data, the first switch routes the telephony data and the internet data to different respective mobile radio modules.

15. The method as claimed in claim 14, wherein
the first switch is provided in the first mobile radio module.

* * * * *